United States Patent [19]

Masui et al.

[11] Patent Number: 5,908,524
[45] Date of Patent: Jun. 1, 1999

[54] METHOD FOR PRODUCING FIBER-REINFORCED THERMOPLASTIC RESIN MOLDED ARTICLE LAMINATED WITH SKIN MATERIAL

[75] Inventors: Syohei Masui, Soraku-gun; Yuji Kobayashi, Chiba; Satoru Funakoshi, Osaka; Katsuhiro Nagayama, Chiba; Masami Fujimaki, Chiba; Hiroyuki Yoshitake, Chiba, all of Japan

[73] Assignees: Sumitomo Chemical Co., Ltd, Osaka; Kawasaki Steel Corp., Hyogo; K-Plasheet Corp., Chiba, all of Japan

[21] Appl. No.: 08/686,951

[22] Filed: Jul. 26, 1996

[30] Foreign Application Priority Data

Jul. 27, 1995 [JP] Japan ........................ 7-191422

[51] Int. Cl.⁶ ................................... B29C 65/70
[52] U.S. Cl. ..................... 156/212; 156/285; 156/309.9
[58] Field of Search ................................. 156/212, 285, 156/245, 309.9; 264/571, 553

[56] References Cited

U.S. PATENT DOCUMENTS

| | | | |
|---|---|---|---|
| 4,173,505 | 11/1979 | Jacobs | 156/285 |
| 4,447,282 | 5/1984 | Valerio et al. | 156/382 X |
| 4,740,417 | 4/1988 | Tornero | 428/308.4 |
| 4,793,793 | 12/1988 | Swenson et al. | 425/503 |

FOREIGN PATENT DOCUMENTS

| | | |
|---|---|---|
| 43 13 043 A1 | 10/1993 | Germany . |
| 4-331137 | 11/1992 | Japan . |
| 6-16277 | 1/1993 | Japan . |

OTHER PUBLICATIONS

Patent Abstracts of Japan, vol. 17, No. 172 (M–1392) (Apr. 2, 1993).
Patent Abstracts of Japan, vol. 17, No. 377 (M–1446) (Jul. 15, 1993).
Patent Abstracts of Japan, vol. 11, No. 64 (M–565) (Feb. 26, 1987).

Primary Examiner—Francis J. Lorin
Attorney, Agent, or Firm—IP Group of Pillsbury Madison & Sutro, LLP

[57] ABSTRACT

A method for producing a fiber-reinforced thermoplastic resin molded article laminated with a skin material comprises the steps of: providing a mold assembly including a first mold and a second mold; preheating a fiber-reinforced thermoplastic resin sheet; preheating a skin material; supplying the preheated sheet and skin material to between the molds; drawing the preheated skin material under reduced pressure so as to bring the skin material into close contact with a cavity face of the second mold; and moving the molds so as to attain a closed state thereby laminating the sheet and skin material together.

16 Claims, 5 Drawing Sheets

METHOD FOR PRODUCING FIBER-REINFORCED THERMOPLASTIC RESIN MOLDED ARTICLE LAMINATED WITH SKIN MATERIAL

BACKGROUND OF THE INVENTION

1. Field of the Invention

The present invention relates to a method for producing a thermoplastic resin molded article or, in particular, a fiber-reinforced thermoplastic resin molded article whose one surface is laminated with a skin material, and a mold assembly used for the method.

2. Related Background Art

Since porous fiber-reinforced thermoplastic resin molded articles are lightweight and excellent in terms of strength, they are widely used for interior automotive parts (e.g., a door trim, a rear trim, and an instrument panel), interior and exterior parts of home electronic equipments, building materials, and the like. Conventionally, as a method for producing such a porous fiber-reinforced thermoplastic resin molded article, a so-called expansion molding method has been known. According to this expansion molding method, initially, a stampable sheet, i.e., a fiber-reinforced thermoplastic resin sheet, is preheated so as to be expanded in the thickness direction thereof. Thereafter, thus expanded sheet is supplied to between upper and lower molds while maintaining the preheated state, pressed between the molds, and then cooled. In this case, the closing clearance between the upper and lower molds is set to a value which is greater than the thickness of the fiber-reinforced thermoplastic resin sheet before preheating but smaller than the thickness of the expanded sheet. Thus, a porous fiber-reinforced thermoplastic resin molded article having a thickness greater than the thickness of the fiber-reinforced thermoplastic resin sheet before preheating is obtained.

The surface of the porous fiber-reinforced thermoplastic resin molded article produced by such an expansion molding method tends to be embossed with its reinforcing fiber from the inside, thereby deteriorating its outer appearance and feel. Accordingly, when a thermoplastic resin molded article is used as interior automotive parts, it is generally used with its surface being laminated with a skin material. As a method of laminating a skin material on the surface of the thermoplastic resin molded article, there has been known a method in which, a step of making the skin material and the fiber-reinforced thermoplastic resin sheet, which has been expanded by preheating, overlap with each other is added to the above-mentioned expansion molding method, whereby thus overlapping materials are pressed between the upper and lower molds and laminated together (Japanese Patent Application Laid-Open Gazette No. Hei 4-331137 (331137/92)). In this case; the closing clearance between the upper and lower molds is set to a value which is greater than the sum of the thickness of the fiber-reinforced thermoplastic resin sheet before preheating and the thickness of the skin material but smaller than the sum of the thickness of the sheet after expansion and the thickness of the skin material.

According to this method, the skin material follows the inner shape of the mold so as to reproduce the mold shape on its surface. In practice, however, there is a tendency that the mold shape may not be faithfully reproduced on the surface of the skin material as a designed surface, the surface may not become a desired shape, and the contour of the surface shape may become unclear.

SUMMARY OF THE INVENTION

The inventors have found that the above-mentioned conventional method may have the following problems. Namely, in the method disclosed in Japanese Patent Application Laid-Open Gazette No. Hei 4-331137, there may be a problem that, since the closing clearance between the upper and lower molds is relatively large, the closing pressure is very low and the pressure under which the skin material is brought into close contact with the mold surface is low. Accordingly, there has been a tendency, such as that mentioned above, that the surface of the skin material fails to attain its desired shape and the contour of the surface shape becomes unclear.

Therefore, it is an object of the present invention to provide a method for producing a porous fiber-reinforced thermoplastic resin molded article laminated with a skin material, by which the mold shape can be faithfully reproduced on the surface of the skin material and by which the skin material can attain a surface shape with a clear contour.

It is another object of the present invention to provide a mold assembly used for the above-mentioned method of the present invention.

The present invention provides a method for producing a fiber-reinforced thermoplastic resin molded article laminated with a skin material, which comprises the steps of:

(a) providing a mold assembly including a first mold and a second mold which can move to and away from each other and form a cavity therebetween when moved to each other;

(b) preheating a fiber-reinforced thermoplastic resin sheet to a temperature not lower than the melting temperature of a matrix resin of the sheet so as to expand the sheet in the thickness direction thereof;

(c) preheating a skin material;

(d) supplying the preheated thermoplastic resin sheet and the preheated skin material, while maintaining respective preheated states thereof, to between the first and second molds which are in an open state, such that the sheet and the skin material are respectively opposed to the first and second molds;

(e) drawing the preheated skin material under reduced pressure by way of an opening formed at the cavity face of the second mold so as to bring the skin material into close contact with the cavity face of the second mold; and (f) moving at least one of the first and second molds to the other so as to attain a closed state, thereby pressing the preheated thermoplastic resin sheet and the preheated skin material between the first and second molds and laminating the sheet and the skin material together.

In the above-mentioned method of the present invention, the skin material and the expanded fiber-reinforced thermoplastic resin sheet are easily laminated together upon heat fusion. Also, since the skin material is brought into close contact with the cavity face of the second mold by suction under reduced pressure, it faithfully reproduces the mold shape.

Also, the above-mentioned method of the present invention can be easily and efficiently performed with a mold assembly in accordance with the present invention.

The mold assembly of the present invention is a mold assembly for pressing a preheated and expanded fiber-reinforced thermoplastic resin sheet and a preheated skin material, while they overlap each other, thereby producing a fiber-reinforced thermoplastic resin molded article laminated with a skin material having a predetermined shape, which comprises:

a first mold having a first cavity face which is to be abutted to the thermoplastic resin sheet;

a second mold having a second cavity face which is opposed to the first cavity face of the first mold and is to be abutted to the skin material, while being provided with a vacuum suction path opening to the second cavity face;

a driving unit, connected to at least one of the first and second molds, for reciprocating the mold connected thereto between an open position where the first and second molds are in an open state and a closed position where the molds are in a closed state; and a vacuum unit, connected to the vacuum suction path, for reducing the pressure within the vacuum suction path in the second mold.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Figure 1:
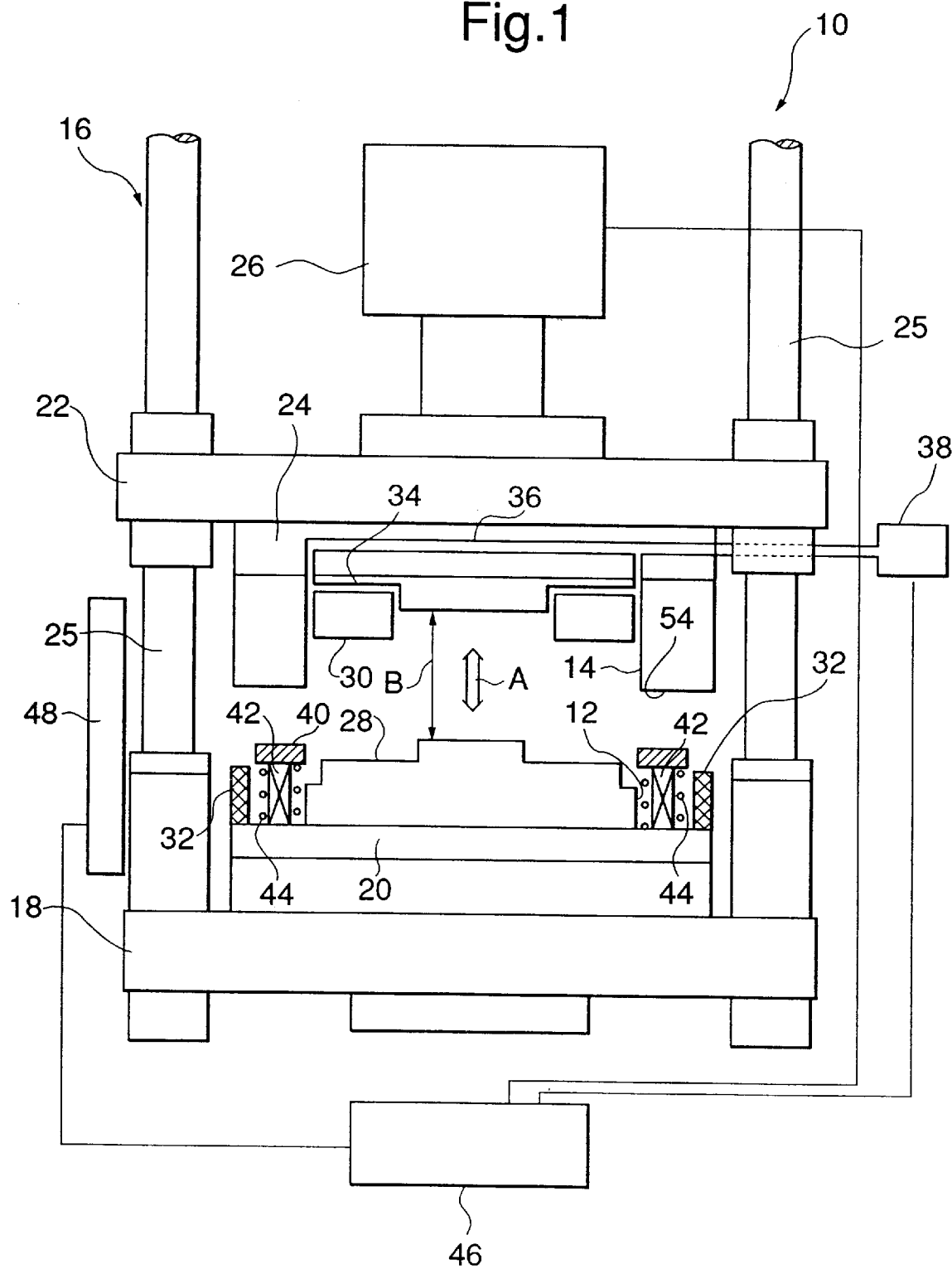
FIG. 1 is a schematic view showing a first embodiment of a mold assembly applied to the method of the present invention.

In the following, the present invention will be described in detail with reference to the accompanying drawings. In the drawings, elements identical or equivalent to each other are referred to with marks identical to each other.

First, explanation will be provided for the mold assembly in accordance with the present invention which is used for producing a fiber-reinforced thermoplastic resin molded article laminated with a skin material.

FIG. 1 schematically shows a preferable embodiment of the mold assembly in accordance with the present invention. As shown in FIG. 1, a mold assembly 10 comprises a first mold 12 and a second mold 14 which are attached to a press unit 16. In FIG. 1, the first mold or stationary mold 12 is fixed to a fixed frame 18 of the press unit 16 by way of a mount 20. The second mold or movable mold 14, on the other hand, is disposed at a position vertically above the first mold 12 and fixed to a movable frame 22 of the press unit 16 by way of a mount 24. The movable frame 24 is connected to the fixed frame 18 by way of a connecting rod 25 so as to be movable up and down in the vertical direction. A driving unit 26 is connected to the movable frame 22. As the driving unit 26 is controlled, the movable frame 22 and, accordingly, the second mold 14 can be reciprocated in the vertical direction, i.e., direction of arrow A in FIG. 1. Here, the driving unit 26 for driving the second mold 14 is not restricted in particular and may be a hydraulic driving unit, for example.

The first mold 12 and second mold 14 respectively have cavity faces 28 and 30 opposed to each other and corresponding to the shape of a desired product. When the first mold 12 and the second mold 14 are closed, the cavity faces 28 and 30 define a cavity space therebetween which coincides with the outer shape of the desired molded article. Also, when necessary, irregularities for forming a three-dimensional pattern such as grains on the surface of the skin material may be provided in a part of or the whole cavity face 30 of the second mold 14. Without being restricted in particular, the material for the molds 12 and 14 can be appropriately selected from various kinds of metal materials, ceramics, wood, resins, and the like depending on the shape and surface state required. In general, a metal material is used therefor.

The second mold 14 can be moved, by the press unit 16, between (i) an open position where a cavity clearance (B in FIG. 1) between the cavity face 28 of the first mold 12 and the cavity face 30 of the second mold 14 is maintained in a state (open state) in which the molded article can be taken out from between the first and second molds 12 and 14 and (ii) a closed position where the cavity clearance B is maintained in a state (closed state) in which it substantially matches the thickness of the desired molded article. In the depicted embodiment, a stopper 32 for limiting the downward movement of the second mold 14 is attached to the mount 20 on the fixed frame 18 such that the second mold 14 is accurately disposed at the closed position. Here, the first and second molds 12 and 14 in FIG. 1 are in the open state.

The first mold 12 shown in FIG. 1 is a so-called male mold whose cavity face 28 is formed as a projecting portion, while the second mold 14 is a so-called female mold whose cavity face 30 is formed as a recessed portions. However, the second mold may be a male mold while the first mold may be a female mold.

Since the skin material is to be attracted to the cavity face 30 of the second mold 14 under reduced pressure as will be explained later, the mold 14 has a vacuum suction path 34 which opens to the cavity face 30. The vacuum suction path 34 is connected to a suction nozzle of a vacuum unit 38 by way of a vacuum suction path 36 formed in a mount 24 for fixing the mold 14 to the movable frame 22.

The depicted second mold 14 is of a divided type comprising a plurality of pieces combined together. Gaps formed between the pieces are used as the vacuum suction path 34. In this case, if there is a secant in the cavity face 30 of the mold 14, a trace of the secant will be transferred to the surface of the skin material. Accordingly, the mold 14 is preferably divided such that the secant is disposed at a portion which becomes a corner section of an indention or protrusion of the cavity face 30 so as to make such a trace inconspicuous.

Around the first mold 12, there is disposed a clamp frame or support member 40 for supporting a fiber-reinforced thermoplastic resin sheet and the skin material which become materials for the molded article to be manufactured. The clamp frame 40 is preferably a continuous ring but may be discontinuous. This clamp frame 40 is supported by a plurality of supporting rods 42 which are attached to the mount 20 on the fixed frame 18 of the press unit 16 so as to be movable up and down. Between the mount 20 and the clamp frame 40, a compression coil spring 44 is disposed so as to surround each supporting rod 42. When the molds 12 and 14 are in the open state where no load is exerted on the spring 44, the clamp frame 40 is supported, by the spring 44, at a height level which is substantially the same as the highest section of the first mold 12. When the molds 12 and 14 are in the closed state, by contrast, the clamp frame 40 is pushed down by the second mold 14, whereby the coil spring 44 is compressed.

To the vacuum unit 38 and the driving unit 26 for the press unit 16, a control unit 46 for controlling them is connected. When controlling the actuations of the driving unit 26 for the press unit 16 and the vacuum unit 38, the control unit 46 preferably senses that the second mold 14 has attained a predetermined position with respect to the first mold 12 before controlling each of the units 26 and 38. In the mold assembly 10 shown in FIG. 1, a position sensor 48 for the second mold 14 is disposed beside the first and second molds 12 and 14 while also being connected to the control unit 46. Here, the position sensor 48 is not restricted in particular, and a sensor which detects the position of the second mold 14 mechanically, electrically, or optically may be used, for example.

Figure 2:
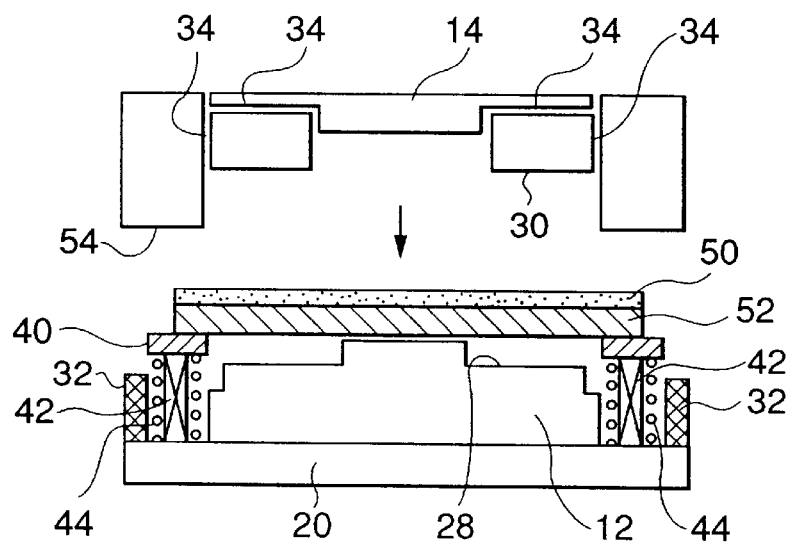
FIGS. 2 to 4 are schematic views respectively showing manufacturing steps of the method of the present invention in which the mold assembly shown in FIG. 1 is used for producing a fiber-reinforced thermoplastic resin molded article.

In the following, a method for producing a fiber-reinforced thermoplastic resin molded article with a skin material, in which the above-mentioned mold assembly 10 is used, will be briefly explained with reference to FIG. 1 as well as FIGS. 2 to 4 which schematically show the operational states of the molds 12 and 14. According to the method of the present invention, as shown in FIG. 2, a preheated skin material 50 and a preheated and expanded fiber-reinforced thermoplastic resin sheet 52, while overlapping each other, are disposed between the molds 12 and 14 which are in the open state. Then, the vacuum unit 38 is actuated so as to attract the skin material 50 toward the cavity face 30 of the second mold 14 under reduced pressure. Accordingly, the skin material 50 is brought into close contact with the cavity face 30 of the second mold 14, whereby the shape of the cavity face 30 is transferred to the skin material 50. After or simultaneously with the suction of the skin material 50, the second mold 14 is moved to the closed position such that the fiber-reinforced thermoplastic resin sheet 52 and the skin material 50 are pressed between the respective cavity faces 28 and 30 of the molds 12 and 14, whereby they are laminated together (see FIGS. 3 and 4).

The method of the present invention will be explained in further detail. First, as materials for the molded article to be produced, appropriate fiber-reinforced thermoplastic resin sheet 52 and skin material 50 are provided.

Examples of the fiber-reinforced resin sheet 52 include a fiber-reinforced resin sheet formed by a laminate method and a fiber-reinforced resin sheet formed by a papermaking method (filtering method). The fiber-reinforced resin sheet formed by a laminate method is a sheet-like molding material which is obtained by a method comprising the steps of sticking a needle into a plurality of strings of strand-like reinforcing fibers so as to entangle the fibers with each other, thereby forming a mat-like strand reinforcing fiber; laminating a thermoplastic resin on thus obtained mat-like strand reinforcing fiber; and then heating and pressing the laminate.

On the other hand, the fiber-reinforced resin sheet formed by a papermaking method is a sheet-like molding material which is obtained by a method comprising the steps of uniformly dispersing and mixing reinforcing fibers having a diameter of 1 to 50 $\mu$m and a length of 1 to 50 mm and a thermoplastic resin powder in water so as to form a suspension; obtaining a non-woven material from thus formed suspension by filtering; and then heating and pressing thus obtained non-woven material. In the present invention, the fiber-reinforced resin sheet formed by a papermaking method, which is more suitable for manufacturing a porous fiber-reinforced thermoplastic resin molded article having a high expansion ratio, is preferably used. In this case, in order to take advantage of the light weight, which is a characteristic of the porous fiber-reinforced thermoplastic resin molded article, a fiber-reinforced resin sheet formed by a papermaking method with a weight per area of 1,500 g/m$^2$ or lower is more preferably used.

Examples of the reinforcing fiber used for such a fiber-reinforced thermoplastic resin sheet 52 include metal fibers such as stainless fiber, inorganic fibers such as glass fiber and carbon fiber, organic fibers such as aramide fiber, and mixed fibers thereof. In particular, glass fibers are most preferably used since a high reinforcing effect can be attained at a low cost. The surface of such a reinforcing fiber may be subjected to a sizing processing in order to improve its adhesion to the matrix resin during the manufacture of the fiber-reinforced thermoplastic resin sheet.

Also, examples of the matrix resin for the fiber-reinforced thermoplastic resin sheet 52 include thermoplastic resins which are normally used in extrusion molding, injection molding, press molding, and the like, for example, general thermoplastic resins such as polyolefin resins (e.x. polyethylene and polypropylene), polystyrene, acrylonitrile-styrene-butadiene copolymer, polyvinyl chloride, polyamide, polycarbonate, polyethylene terephthalate, polybutylene terephthalate, polyphenylene ether, and styrene-acrylonitrile copolymer; thermoplastic elastomers; mixtures thereof; polymer alloys using these thermoplastic resins; and their modified products. These resins may arbitrarily contain various compounding agents such as stabilizers, pigments, and fillers which are normally compounded therein.

The content of reinforcing fiber in the fiber-reinforced thermoplastic resin sheet 52 is appropriately selected according to the aimed object. In general, as the reinforcing fiber content is smaller, the expansion ratio becomes smaller, thereby yielding a porous fiber-reinforced resin molded article with a lower porosity; while, as the reinforcing fiber content is greater, the expansion ratio becomes greater, thereby yielding a porous fiber-reinforced resin molded article with a higher porosity. Since the mechanical strength may be lowered or the adhesion to the skin material may deteriorate when the content is too high, it normally lies within the range of 10 to 70% by weight.

The skin material 50 applied to the present invention is appropriately selected according to various purposes of use such as rendering of surface decoration, cushioning, thermal insulating properties, airtightness, and the like, while not being restricted in particular. Nevertheless, it is necessary for the skin material 50 to have a thermal resistance so as not to be melted or broken upon preheating. As the skin material 50, conventionally known skin materials made of materials such as various woven fabrics, knitted fabrics, non-woven fabrics, a sheet composed of a thermoplastic resin or thermoplastic elastomer, a foamed sheet of a thermoplastic resin or thermoplastic elastomer, or a laminate comprising at least two materials mentioned above may be used. The surface of the skin material 50 may be decorated beforehand with three-dimensional patterns such as grain patterns, printing, and the like.

Here, in the method of the present invention, since the skin material 50 is to be attracted to the cavity face 30 of the second mold 14 by suction under reduced pressure, it is necessary for the skin material 50 to have airtightness. Accordingly, preferably, in the case of the woven fabrics, knitted fabrics, and the like which are air-permeable themselves, while they are used as a surface layer, their rear side is backed with a sheet made of a thermoplastic resin or thermoplastic elastomer or a foamed sheet of a thermoplastic resin or thermoplastic elastomer to form an airtight laminate, which may be used as the skin material. Also, a skin material comprising a sheet made of a thermoplastic elastomer as its surface layer and a foamed article of a thermoplastic resin or thermoplastic elastomer as its backing material is preferably used as the skin material since it is excellent in the surface appearance and has cushioning, while grain patterns, characters, and the like formed in a mold can be relatively easily transferred to the surface.

As will be explained later, the skin material 50 and the fiber-reinforced thermoplastic resin sheet 52 are bonded together upon heat fusion of the rear side of the preheated skin material 50 and the matrix resin of the fiber-reinforced thermoplastic resin sheet 52 which has been expanded upon preheating. Accordingly, the material of the skin material 50 itself or the backing sheet on the rear side thereof is desirably of the same kind as or structurally similar to the matrix resin of the fiber-reinforced thermoplastic resin sheet 52. Nevertheless, they may be different kinds of materials as long as they can be fused together by heat. Also, when their bonding effect by heat fusion is scarce due to their different kinds of materials or the like, for example, a hot-melt adhesive sheet may be attached to the rear side of the skin material before use. Also, according to circumstances, there may be used a skin material in which a film composed of two thermoplastic resin layers respectively meltable and unmeltable by the heat of the preheated fiber-reinforced thermoplastic resin sheet 52 is laminated on the rear side of the skin material by an adhesive or the like such that the meltable resin layer faces the outside.

When appropriate fiber-reinforced thermoplastic resin sheet 52 and skin material 50 are provided, while this sheet 52 is preheated by an appropriate means so as to be expanded in the thickness direction thereof, the skin material 50 is preheated by another appropriate means.

Though the preheating temperature of the fiber-reinforced thermoplastic resin sheet 52 varies depending on the kind of the fiber-reinforced thermoplastic resin sheet used, for example, in the case of the fiber-reinforced thermoplastic resin sheet in which a glass fiber is used as its reinforcing fiber and a polypropylene resin is used as its matrix resin, the preheating temperature is not lower than the melting temperature of the matrix resin and is usually at 180 to 220° C. When the preheating temperature is lower than this range, expansion may not be fully obtained or adhesion to the skin material may deteriorate. Above this range, by contrast, the fiber-reinforced thermoplastic resin sheet may deteriorate by heat or it may become hard to handle.

Also, though the preheating temperature of the skin material 50 varies according to the kind of the skin material used, it is necessary to attain at least a temperature where the skin material is softened so as to be brought into close contact with the cavity face 30 of the second mold 14 by suction under reduced pressure. When the cavity face 30 of the second mold 14 has a three-dimensional pattern such as grain pattern, the skin material 50 is preheated to a temperature where the skin material 50 is softened such that this pattern can be transferred to the skin material 50. When the preheating of the skin material 50 is insufficient, the degree of softening becomes insufficient as well, whereby the skin material 50 may not be sufficiently in close contact with the second mold 14 at a portion where the draw (ratio of the depth of the cavity to the area of the cavity) is high, the transfer of the grain pattern or the like may become insufficient, or the adhesion of the skin material 50 and the fiber-reinforced thermoplastic resin sheet 52 to each other upon heat fusion may deteriorate. When the skin material 50 is heated too much, by contrast, the skin material or the backing material may be melted or broken, thereby changing the tint of the designed surface. Accordingly, in the case of the skin material 50 using a thermoplastic elastomer as its skin layer and a thermoplastic resin foamed sheet as its backing layer, for example, it is preferably heated to about 100 to 180° C. on the skin layer side and about 80 to 150° C. on the foamed layer side.

When the fiber-reinforced thermoplastic resin sheet 52 has been preheated to a desired temperature so as to be expanded and the skin material 50 has been preheated to a desired temperature, they are overlapped with each other as shown in FIG. 2 and then supplied to between the first and second molds 12 and 14, which are in the open state, and disposed on the clamp frame 40. It is desirable that this step be performed immediately after the preheating step so as to maintain the preheating temperatures of the skin material 50 and the thermoplastic resin sheet 52 as much as possible. Here, the thermoplastic resin sheet 52 and the skin material 50 may be overlapped with each other such that the thermoplastic resin sheet 52 is initially disposed on the clamp frame 40 and then the skin material 50 is disposed on this sheet 52. While the clamp frame 40 functions to prevent the skin material 50 and the thermoplastic resin sheet 52 from wrinkling, the thermoplastic resin sheet 52 and the skin material 50 may be directly disposed on the first mold 12 without the aid of the clamp frame 40.

Thereafter, the driving unit 26 for the press unit 16 is controlled so as to move the second mold 14 downward from the open position. When the lower surface, i.e., a parting face 54, of the peripheral portion of the second mold 14 has come into contact with the skin material 50 mounted on the clamp frame 40, the vacuum unit 38 is actuated (see FIG. 3). More specifically, when the control unit 46 has judged that the second mold 14 had reached a height level of the upper surface of the clamp frame 40 or a position slightly thereabove according to a signal from the position sensor 48, the control unit 46 actuates the vacuum unit 38. The actuation of the vacuum unit 38 may be started simultaneously with the descending of the second mold 14 or, alternatively, at an appropriate timing before the skin material 50 and the parting face 54 of the mold 14 come into contact with each other.

When the second mold 14 is continuously descended while maintaining the state in which the vacuum unit 38 is actuated, since a closed space is formed between the skin material 50 and the cavity face 30 of the second mold 14, the skin material 50 proceeds to be attracted to the cavity face 30 of the second mold 14. Then, as shown in FIG. 4, substantially at the same time when the skin material 50 has been completely attracted to the cavity face 30 of the second mold 14, the second mold 14 abuts to the stopper 32 and stops at the closed position. According to a signal from the position sensor 48, the control unit 46 judges that the second mold 14 has reached the stopper 32 and stops actuating the driving unit 26. The gap, i.e., cavity clearance B, between the first and second molds 12 and 14 in the closed state substantially coincides with the thickness of the desired molded article. In other words, the cavity clearance B is set within a range in which it is smaller than the sum of the thickness of the thermoplastic resin sheet 52 expanded by preheating and the thickness of the preheated skin material 50 but greater than the sum of the thickness of the thermoplastic resin sheet 52 and the thickness of the skin material 50 before preheating. Accordingly, the fiber-reinforced thermoplastic resin sheet 52 and the skin material 50 are pressed between the first and second molds 12 and 14 under a desired closing pressure.

Thereafter, while the vacuum unit 38 is continuously actuated, the molds 12 and 14 are cooled with their closed state being maintained, the thermoplastic resin sheet 52 and the skin material 50 are fused together, thereby forming a porous fiber-reinforced thermoplastic resin molded article 56 with the skin material having a desired porosity. The porosity of thus obtained molded article 56 can be adjusted as the above-mentioned cavity clearance B is adjusted within the above-mentioned range. Also, since the skin material 50 is brought into close contact with the cavity face 30 of the second mold 14, the shape of the skin material 50 and the shape of the cavity face 30 become substantially complementary to each other, whereby the contour of the surface shape of the skin material 50 is clearly represented. Also, when the cavity face 30 of the second mold 14 is decorated with a grain pattern or the like, such a pattern is faithfully transferred to the surface of the skin material 50.

When the molds 12 and 14 are configured such that the outer peripheral surface of the first mold 12 and the inner peripheral surface of the second mold 14 engage each other to form a cavity space immediately before the second mold 14 reaches the closed position, the degree of vacuum within the cavity space increases such that the molded article 56 shaped to have a deep draw can be easily manufactured.

Also, in this method, the first mold 12 has a function similar to that of a plug assist in a vacuum molding method, whereby the skin material 50 can be prevented from being locally thinned at a portion with a deep draw.

Figure 5:
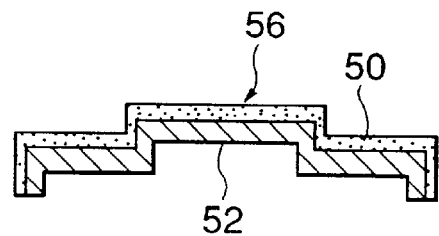
FIG. 5 is a schematic view showing a fiber-reinforced thermoplastic resin molded article manufactured with the mold assembly shown in FIG. 1.

Thereafter, when the driving unit 26 for the press unit 16 is controlled so as to return the second mold 14 to the open position, the porous fiber-reinforced thermoplastic resin molded article 56 laminated with the skin material, which is a final product, can be taken out. FIG. 5 is a schematic view showing the final molded article 56.

Though a preferable embodiment of the present invention is explained in the foregoing, it is needless to mention that the present invention should not be restricted thereto. For example, while the vacuum suction of the skin material 50 to the cavity face 30 of the second mold 14 and the closing of the molds 12 and 14 are performed in parallel with each other in the above-mentioned method, there may be effected a method in which the vacuum suction of the skin material 50 is initially effected and then the closing is started after the skin material 50 has come into close contact with the cavity face 30 of the second mold 14.

Figure 6:
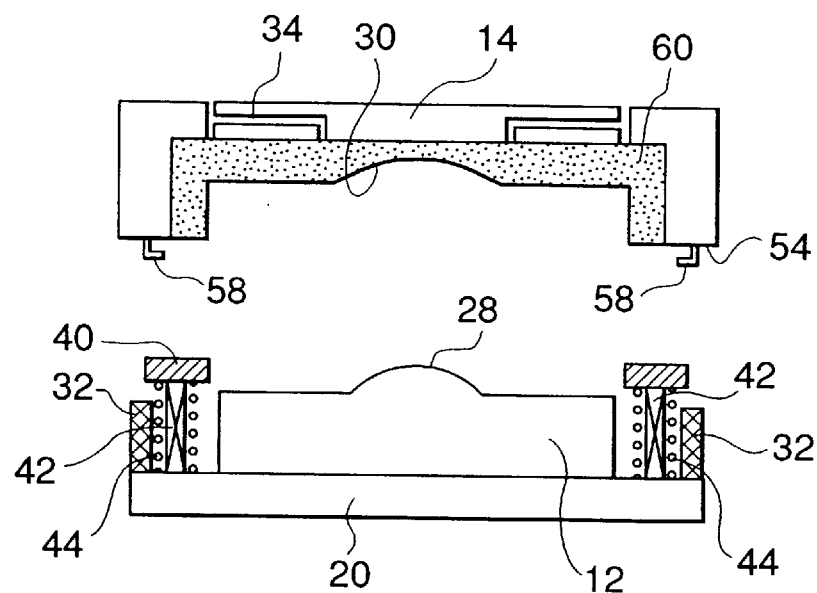
FIGS. 6 to 9 are schematic views respectively showing manufacturing steps for producing a molded article in another embodiment.
Figure 7:
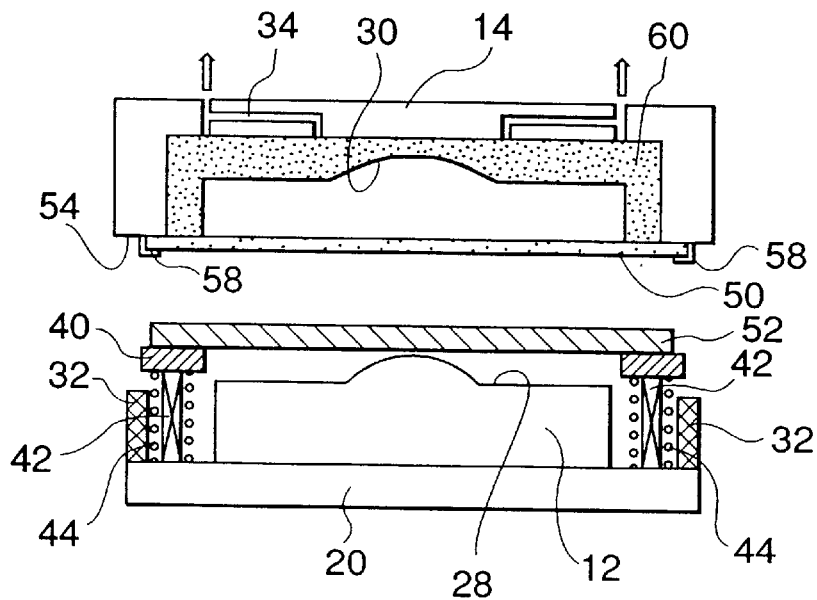
Figure 8:
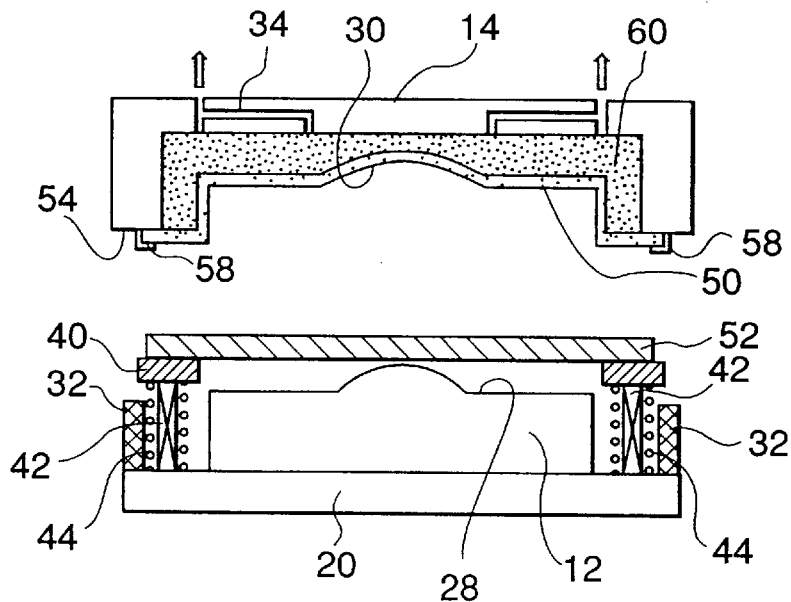

In this second method, it is necessary that the skin material 50 be brought into contact with the lower surface (parting face) 54 of the peripheral portion of the second mold 14 beforehand so as to form a substantially closed space between the cavity face 30 of the second mold 14 and the skin material 50. Therefore, preferably, as shown in FIGS. 6 and 7, a supporting member 58 such as a hook is attached to the lower surface 54 of the outer peripheral portion of the second mold 14 so as to support the skin material 50. Also, when the skin material 50 and the thermoplastic resin sheet 52 maintained at their preheating temperatures are overlapped with each other beforehand, since they are partially fused together, the thermoplastic resin sheet 52 is attracted to the second mold 14 together with the skin material 50 at the time of vacuum suction. When the thermoplastic resin sheet 52 is attracted to the second mold 14, there is a possibility that the wrinkles are generated in the thermoplastic resin sheet 52 at the time of closing. Accordingly, when the skin material 50 and the fiber-reinforced thermoplastic resin sheet 52 are disposed between the molds 12 and 14 in the open state, preferably, as shown in FIG. 7, the thermoplastic resin sheet 52 is mounted on the clamp frame 40 while being separated from the skin material 50 supported by the supporting member 58. When the vacuum unit (not shown in FIG. 7) is actuated after the disposition shown in FIG. 7 has been attained, the skin material 50 comes into close contact with the cavity face 30 of the second mold 14 as shown in FIG. 8. Then, when the second mold 14 descends to the closed position, the skin material 50 and the thermoplastic resin sheet 52 come into close contact with each other and are fused together (see FIG. 9), thereby yielding the molded article 56 with a desired shape as shown in FIG. 10.

Here, the cavity space formed by the molds 12 and 14 in FIGS. 6 to 9 has a relatively small draw. Also, it should be noted that the portion of the second mold 14 having the cavity face 30 is formed as a porous article 60 such as a porous electroformed mold. When the porous article 60 is used, a number of very minute suction openings are disposed throughout the cavity face 30, whereby the skin material 50 is attracted to the cavity face 30 in a balanced manner at the time of vacuum suction. Also, the suction opening is so minute that no attention has to be paid to traces of the suction openings which may be attached to the surface of the skin material 50. In this case, it will be seen that the void portion of the porous article 60 functions as a vacuum suction path. It is needless to mention that the whole mold 14 may be constituted by a porous article.

Further, when the above-mentioned supporting member 58 is configured so as to clamp an edge of the skin material 50 while being slidable in lateral directions, the supporting member 58 can adjust the tension of the skin material 50 clamped thereby. Similarly, though not depicted, a slidable clamp member may be disposed at the clamp frame 40 so as to adjust the tension of the thermoplastic resin sheet 52 clamped by this clamp member. As the degrees of tension of the thermoplastic resin sheet 52 and skin material 50 are adjusted in this manner, the state of sliding of the sheet 52 and skin material 50 into the cavity space can be adjusted, whereby the molded article 56 can be obtained without wrinkles.

Figure 11:
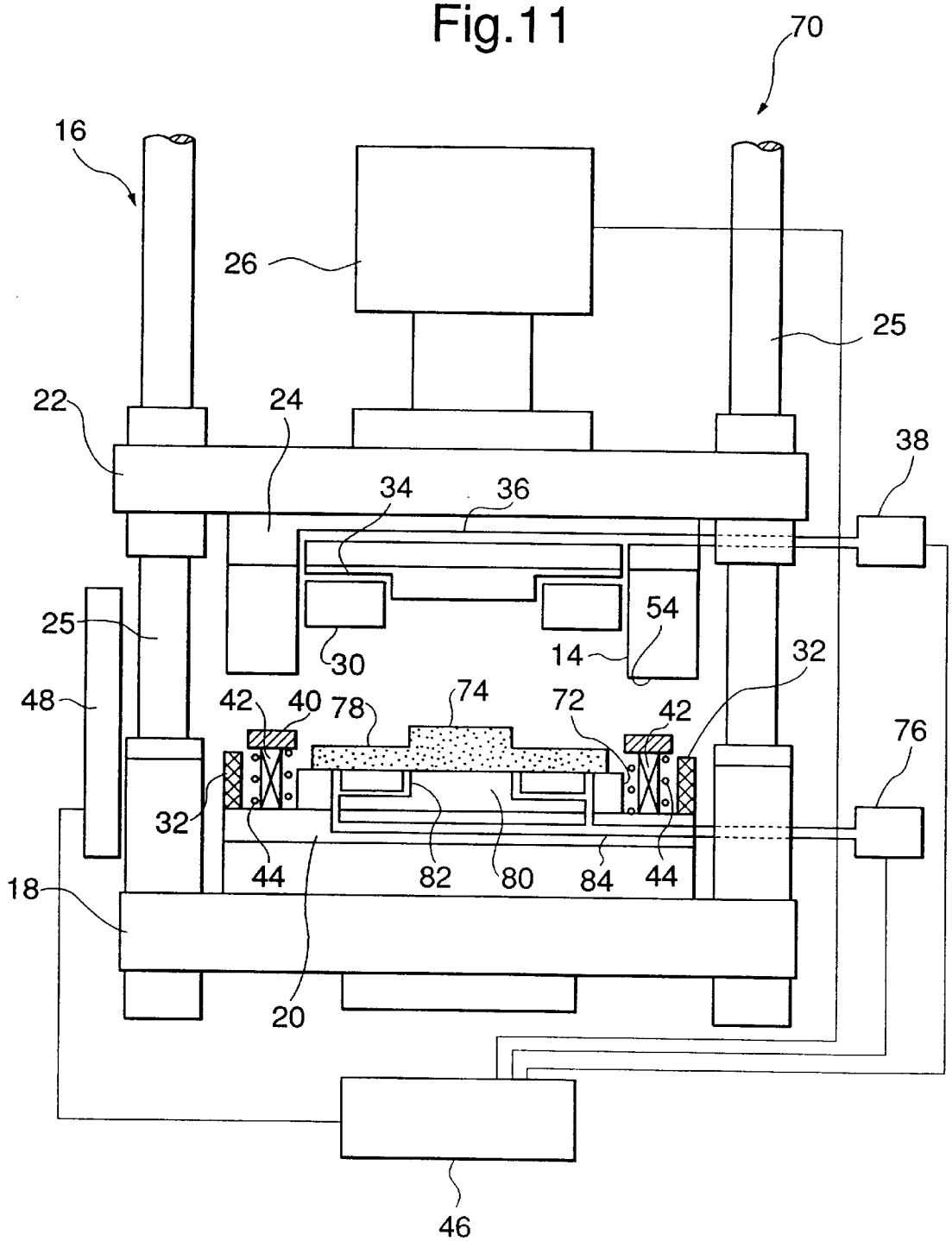
FIG. 11 is a schematic view showing a second embodiment of the mold assembly applied to the method of the present invention.

FIG. 11 is a schematic view showing the second embodiment of the mold assembly in accordance with the present invention. A mold assembly 70 of FIG. 11 is substantially the same as the mold assembly 10 shown above except that a first mold 72 is equipped with a porous article 74 and a pressurized gas supplying unit 76 for supplying a pressurized gas into the cavity space. Accordingly, the constituents and portions of the mold assembly 70 substantially identical to or equivalent to those of the above-mentioned mold assembly 10 are referred to with the marks identical to the latter without their overlapping explanations being repeated.

The upper portion, including a cavity face 78, of the first mold 72 is constituted by the porous article 74 such as a porous electroformed mold. Also, at a lower portion 80 of the first mold 72, a pressurized gas supplying path 82 which opens to its boundary with respect to the upper portion 74 is formed. This pressurized gas supplying path 82 is connected to a gas supplying nozzle of the pressurized gas supplying unit 76 by way of a pressurized gas supplying path 84 formed in the mount 20 on the fixed frame 18. The pressurized gas supplying unit 76 is controlled by the control unit 46 which controls the vacuum unit 38 and the driving unit 26 for the press unit 16.

The method for producing the fiber-reinforced thermoplastic resin molded article, in which the mold assembly 70 having the first mold 72 is used, is substantially the same as the method explained above with reference to FIGS. 2 to 4. When the mold assembly 70 of FIG. 11 is used, however, the pressurized gas supplying unit 76 may be actuated immediately before the second mold 14 reaches the closed position so that a pressurized gas such as pressurized air is spouted out from a number of very minute openings present at the upper surface, i.e., cavity face 78, of the porous article 74 by way of the pressurized gas supplying paths 82 and 84 and the void portions of the porous article 74. When the pressurized gas is spouted out from the cavity face 78 of the first mold 72, by way of the void portions of the thermoplastic resin sheet (not shown in FIG. 11) which has been expanded and made porous, the spouted gas urges the skin material (not shown in FIG. 11) against the cavity face 30 of the second mold 14. Accordingly, together with the attraction of the skin material to the second mold 14 under reduced pressure, the skin material securely comes into close contact with the cavity face 30 of the second mold 14. Therefore, the skin material can faithfully reproduce the shape of the second mold 14. Here, the pressurized gas can be supplied when the control unit 46 has sensed that the second mold 14 had reached a predetermined position immediately in front of the closed position according to a signal from the position sensor 48. Also, without the aid of the porous article 74, the first mold 72 may have a one-piece configuration which is equipped with a gas supplying path opening to the cavity face 78.

As methods other than those mentioned above, when a molded article with a relatively small draw is to be manufactured, there can be used a method in which a preheated skin material is attracted to the cavity face of the second mold by vacuum suction and then a fiber-reinforced thermoplastic resin sheet expanded by preheating is supplied to between the molds which are subsequently closed, as well as a method in which a preheated skin material and a fiber-reinforced thermoplastic resin sheet expanded by preheating are supplied to between the molds which are subsequently closed and, after the completion of closing, the skin material is brought into close contact with the cavity face by vacuum suction by way of the second mold. These methods are suitable for the cases where a planar molded article with relatively less draw is to be made.

Though the second mold is movable in the mold assemblies 10 and 70 in the foregoing embodiments, the first mold may be made movable while the second mold is made stationary, or both of the first and second molds may be made movable. Also, the first and second molds may be arranged in a row in the horizontal direction, and one or both of the molds may be made movable in the horizontal direction so as to perform opening and closing operations.

While a porous fiber-reinforced thermoplastic resin molded article laminated with a skin material can be manufactured in accordance with the methods such as those mentioned above, its specific molding conditions such as the timing for drawing the skin material by vacuum suction and the timing for starting the closing can be appropriately determined according to the shape of the aimed molded article and the like.

In accordance with the method of the present invention, a skin material and an expanded fiber-reinforced thermoplastic resin sheet are easily laminated together upon heat fusion. Also, a porous fiber-reinforced thermoplastic resin molded article laminated with a skin material having a clear contour can be manufactured. Thus obtained molded article can be widely utilized for interior automotive parts such as a door trim and a ceiling material, for example, as a molded article having a light weight, a high strength, and a favorable outer appearance.

EXAMPLES

In the following, the present invention will be explained in further detail with reference to examples, which by no means restrict the present invention Example 1

Figure 3:
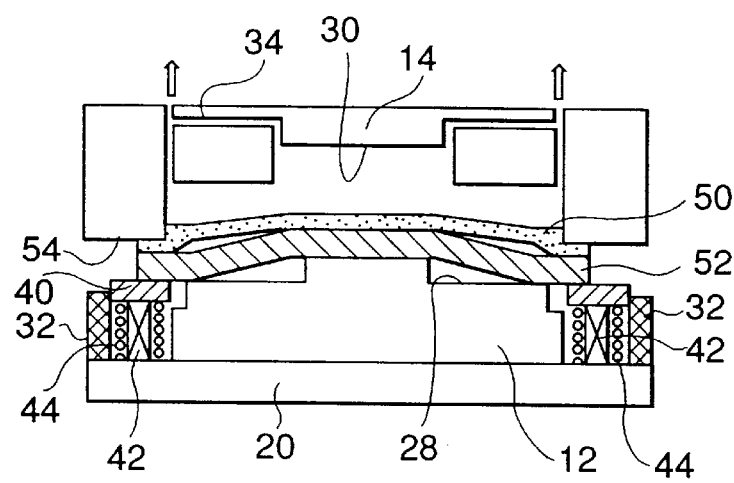
Figure 4:
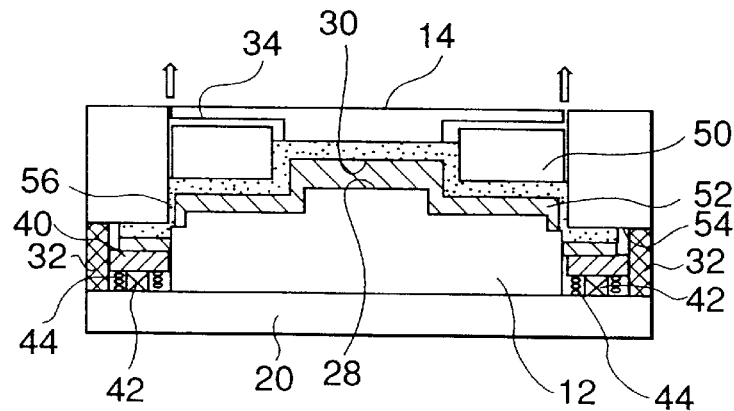

While the mold assembly (10) shown in FIG. 1 was used, according to the steps shown in FIGS. 2 to 4, a porous fiber-reinforced thermoplastic molded article (56) which was laminated with a skin material and had a cross-sectional shape shown in FIG. 5 was manufactured by the following method. Here, the second mold (14) is made of a porous electroformed mold whose cavity face (30) is processed with a grain pattern and which can perform vacuum suction through the whole surface of the cavity face (30) with the vacuum unit (38).

While such upper and lower molds (12 and 14) were placed in the open state, a preheated skin material (50) and a fiber-reinforced thermoplastic resin sheet (52) expanded in the thickness direction thereof by preheating were mounted on the clamp frame (40), which was disposed at the outer periphery of the first mold (12), such that they overlap each other with the skin material (50) being placed on top. As the skin material, there was used a laminate sheet with a thickness of about 3.5 mm comprising an olefin thermoplastic elastomer sheet as its surface layer material and a polypropylene foamed sheet attached to the rear side thereof. As the fiber-reinforced thermoplastic resin sheet, there was used a fiber-reinforced thermoplastic resin sheet having a thickness of about 1 mm made by a papermaking method (manufactured by K-plasheet Corporation; having a glass fiber content of 45% by weight and a weight per area of 1,200 g/m$^2$) in which the matrix resin is polypropylene and the reinforcing fiber is a glass fiber having a mean fiber length of 25 mm.

These materials were preheated in a far infrared ray heating furnace such that the skin material (50) became 160° C. on the olefin thermoplastic elastomer sheet side and 120° C. on the foamed sheet side, whereas the fiber-reinforced thermoplastic resin sheet (52) manufactured by a papermaking method became 210° C. which was not lower than the melting temperature of the matrix resin. Upon this preheating, the fiber-reinforced thermoplastic resin sheet (52) manufactured by a papermaking method was expanded in the thickness direction till the thickness thereof became about 6 mm.

Immediately after the skin material (50) and the thermoplastic resin sheet (52) made by a papermaking method were mounted on the clamp frame (40) while their preheated states were maintained (FIG. 2), the second mold (14) was descended to start a closing operation and, simultaneously, the vacuum unit (38) was actuated.

When the second mold (14) reached a position which was 50 mm in front of the closed position, the parting face (54) of the second mold (14) and the skin material (50) came into contact with each other, whereby the vacuum suction of the skin material (50) was started (FIG. 3).

While the vacuum suction was continued, the closing was completed. The cavity clearance (B) at the time when the closing was completed (FIG. 4) was set to 6.5 mm by the stopper (32) disposed at the outer peripheral portion of the first mold (12).

After the completion of closing, the molds (12 and 14) were cooled, and then a porous fiber-reinforced thermoplastic resin molded article (56) with a skin material having a cross-sectional shape such as that shown in FIG. 5 was taken out therefrom.

The expansion ratio of the planar portion of the fiber-reinforced thermoplastic resin molded article, which is the core section of thus obtained molded article (56), was about three times that of the sheet (52) before preheating (the preheated and expanded sheet being compressed to a 50%-thickness). Also, the mold shape and the grain pattern of the cavity face (30) of the second mold were faithfully transferred to the skin material (50), without the shape of the skin material (50) becoming unclear. Also, its adhesion to the porous fiber-reinforced thermoplastic resin sheet (52) was favorable. Further, the molded article (56) exhibited a sufficient rigidity, favorable cushioning and outer appearance.

Example 2

Figure 9:
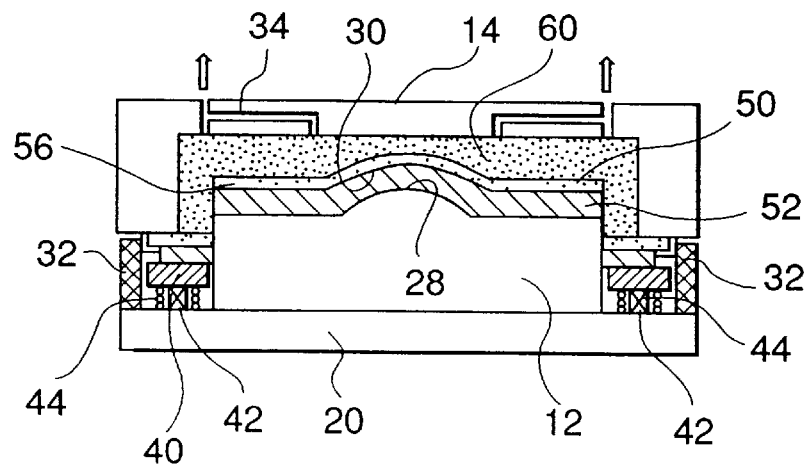
Figure 10:
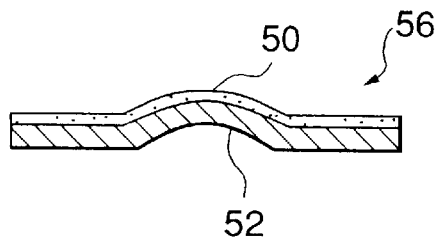
FIG. 10 is a schematic view showing a fiber-reinforced thermoplastic resin molded article manufactured according to the steps of FIGS. 6 to 9.

While the mold assembly (10) shown in FIG. 6 was used, according to the steps shown in FIGS. 7 to 9, a porous fiber-reinforced thermoplastic molded article (56) which was laminated with a skin material and had a cross-sectional shape shown in FIG. 10 was manufactured by the following method.

Specifically, there were used first and second molds (12 and 14) which had been configured so as to define a cavity space designed to have a protrusion with a smoothly tilted curve though being substantially planar as a whole. A porous fiber-reinforced thermoplastic resin molded article laminated with a skin material was manufactured under the same conditions as those of Example 1 except that the skin material (50) was set in the second mold (14) before the closing operation was started such that the closing operation was effected immediately after the skin material (50) was attracted to the molding surface thereof by vacuum suction.

Though thus obtained molded article (56) had a skin material which was slightly thinner at the protruded portion, it reproduced the mold shape in detail while exhibiting favorable cushioning and outer appearance.

Comparative Example 1

A porous fiber-reinforced thermoplastic resin molded article laminated with a skin material was manufactured under the same conditions as those of Example 1 except that the closing operation was effected with neither preheating of the skin material (50) nor vacuum suction.

Without the mold shape being reproduced as it was, the contour of the skin material became unclear at edge portions of thus obtained molded article. Also, the adhesion of the skin material and the porous fiber-reinforced thermoplastic resin molded article to each other was partially insufficient.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application No. 191422/1995 filed on Jul. 27, 1995 is hereby incorporated by reference.

What is claimed is:

1. A method for producing a fiber-reinforced thermoplastic resin molded article laminated with a skin material, said method comprising the steps of:

(a) providing a mold assembly including a first mold and a second mold having respective opposing cavity faces, said cavity face of said second mold having at least one opening therein, said molds being capable of moving to and away from each other, said first mold and second mold having cavity faces defining a cavity therebetween when said molds are moved towards each other;

(b) preheating a fiber-reinforced thermoplastic resin sheet to a temperature not lower than a melting temperature of a matrix resin of said sheet so as to expand said sheet in a thickness direction thereof;

(c) preheating a skin material;

(d) supplying said preheated thermoplastic resin sheet and said preheated skin material, while maintaining respective preheated states thereof, between said first and second molds which are in an open state, such that said preheated thermoplastic sheet and said skin material are respectively opposed to said first and second molds;

(e) drawing said preheated skin material under reduced pressure by way of said at least one opening formed at the cavity face of said second mold so as to bring said skin material into close contact with the cavity face of said second mold; and (f) moving at least one of said first and second molds to the other so as to attain a closed state, thereby pressing said preheated thermoplastic resin sheet and said preheated skin material between said first and second molds and laminating said sheet and said skin material together, said step (e) and said step (f) being performed in parallel with each other.

2. A method according to claim 1, wherein, in the step (f), said first and second molds are closed together such that said cavity has a clearance which is greater than a sum of a thickness of said thermoplastic resin sheet before preheating and a thickness of said skin material before preheating but smaller than a sum of the thickness of said expanded thermoplastic resin sheet and the thickness of said preheated skin material.

3. A method according to claim 1, wherein in step (f) said fiber-reinforced thermoplastic resin sheet is formed by pressing between said first mold and said second mold.

4. A method according to claim 1, wherein, in the step (d), while said preheated thermoplastic resin sheet and said preheated skin material are overlapped with each other, said sheet and said skin material are disposed between said first and second molds.

5. A method according to claim 4, wherein said skin material is a composite product made of a thermoplastic elastomer layer and a thermoplastic resin foamed layer and wherein, in the step (d), said thermoplastic resin sheet and said skin material are disposed such that said thermoplastic resin foamed layer and said thermoplastic resin sheet are opposed to each other.

6. A method according to claim 1, wherein, in the step (d), while said preheated thermoplastic resin sheet and said preheated skin material are separated from each other, said sheet and said skin material are disposed between said first and second molds.

7. A method according to claim 6, wherein said skin material is a composite product made of a thermoplastic elastomer layer and a thermoplastic resin foamed layer and wherein, in the step (d), said thermoplastic resin sheet and said skin material are disposed such that said thermoplastic resin foamed layer and said thermoplastic resin sheet are opposed to each other.

8. A method according to claim 1, wherein the step (f) further comprises a step of supplying a pressurized gas by way of an opening, formed at a cavity face of said first mold, immediately before completion of closing so as to urge said skin material against said second mold.

9. A method according to claim 1, wherein the cavity face of said second mold is provided with a three-dimensional pattern.

10. A method according to claim 1, wherein a portion of said second mold to which said skin material abuts is constituted by a porous article.

11. A method according to claim 1, wherein said mold assembly has a member for supporting said thermoplastic resin sheet.

12. A method according to claim 1, wherein said mold assembly has a member for supporting said skin material.

13. A method according to claim 1, wherein said first mold is made stationary and wherein said second mold is adapted to be reciprocated in a vertical direction above said first mold.

14. A method according to claim 13, wherein said mold assembly has a member for mounting said thermoplastic resin sheet thereon around said first mold and wherein, in the step (d), said thermoplastic resin sheet is mounted on said member.

15. A method according to claim 13, wherein said second mold has a member for supporting said skin material at a lower surface of an outer peripheral portion of said second mold and wherein, in the step (d), said skin material is supported by said member.

16. A method according to claim 1, wherein said thermoplastic resin sheet is a fiber-reinforced thermoplastic resin sheet manufactured by a papermaking method.

* * * * *